United States Patent [19]

Lowder et al.

[11] Patent Number: 5,061,149

[45] Date of Patent: Oct. 29, 1991

[54] FORK LIFT VEHICLE HAVING A TELESCOPIC BOOM WITH AN ARTICULATED JIB SECTION CAPABLE OF VERTICAL AND HORIZONTAL SWINGING RELATIVE TO THE BOOM

[75] Inventors: James E. Lowder; Ronald R. Shinn; John L. Baker, all of Lubbock, Tex.

[73] Assignee: Ealgle-Picher Industries, Inc., Cincinnati, Ohio

[21] Appl. No.: 527,348

[22] Filed: May 23, 1990

Related U.S. Application Data

[62] Division of Ser. No. 394,889, Aug. 17, 1989, Pat. No. 4,986,721.

[51] Int. Cl.[5] .......... B60P 1/00

[52] U.S. Cl. .......... 414/687; 212/230; 212/268; 414/667; 414/718; 52/118

[58] Field of Search .......... 212/268, 267, 264, 230, 212/185, 144; 52/111, 115, 117, 118; 414/639, 664, 665, 666, 667, 668, 669, 670, 671, 685, 718, 723, 546, 547, 687

[56] References Cited

U.S. PATENT DOCUMENTS

| | | | |
|---|---|---|---|
| 3,462,023 | 8/1969 | Grove | 212/268 |
| 3,567,054 | 3/1971 | Emke | 414/639 |
| 3,684,113 | 8/1972 | Roller | 414/667 X |
| 3,738,075 | 6/1973 | Nansel | 52/115 |
| 3,795,321 | 3/1974 | Johnston | 212/268 X |
| 3,985,249 | 10/1976 | Aker et al. | 414/723 |
| 4,034,875 | 7/1977 | Pugh et al. | 212/268 X |
| 4,295,771 | 10/1981 | Mehesan, Jr. | 414/718 X |
| 4,350,255 | 9/1982 | Blase et al. | 52/115 X |
| 4,381,166 | 4/1983 | Smart | 414/667 X |
| 4,619,579 | 10/1986 | Frison | 414/661 X |
| 4,756,661 | 7/1988 | Smart | 414/667 |

FOREIGN PATENT DOCUMENTS

| | | | |
|---|---|---|---|
| 1217041 | 5/1966 | Fed. Rep. of Germany | 212/268 |
| 2739325 | 3/1978 | Fed. Rep. of Germany | 414/685 |
| 3343343 | 6/1984 | Fed. Rep. of Germany | 212/268 |
| 2607485 | 6/1988 | France | 414/785 |
| 1461750 | 2/1989 | U.S.S.R. | 212/268 |

OTHER PUBLICATIONS

JCB 530b-HL, Turbo Loadall, More Muscle, Less Bulk USA 6018-10M REV 2/88, Brochure.

JCB 525B 4HL Loadall, Reaching Out, Handling the Heavy Load, USA R5018-20M-R 6/85, Brochure.

TCI Power Products, Inc., DYNALIFT Heavy Duty D4P100 Highlift Features that Last, So Your Profits Will!, Brochure.

TCI Power Products, Inc., DYNALIFT 7000 Lb. Maximum Capacity 7,000 lbs. High Performance Special, Brochure.

D4P90 DYNALIFT, TCI Power Products, Inc., GAO-143, Brochure.

TCI Power Products, Inc., DYNALIFT D4P80 Highlift, The Profit Maker, Brochure.

TCI Power Products, Inc., DYNALIFT D4P60 Highlift Built to Keep You in the Black, Brochure.

LULL HIGHLANDER Highlift, Jun. 1985, Brochure.

LULL HIGHLANDER Highlift, Model 844, Oct. 1985, Brochure.

SKYTRAK 4025 Rough Terrain Forklift, SKYTRAK 6034, 9038, Koehring Construction Equipment, GAO-143, Brochure.

(List continued on next page.)

*Primary Examiner*—Robert J. Spar

*Assistant Examiner*—James Ellen

*Attorney, Agent, or Firm*—Wood, Herron & Evans

[57] ABSTRACT

An extendable boom fork lift vehicle is described wherein the boom and its actuator are positioned over the rear axle of the vehicle such that the weight of the frame between the front and rear axles and behind the rear axle may be reduced. A modified boom and jib are also described wherein the jib may be selectively fixed relative one telescoping member of the boom. A light-duty carriage is provided to operably engage and articulate a secondary heavy-duty carriage.

1 Claim, 7 Drawing Sheets

OTHER PUBLICATIONS

Sellick MAXI-REACH, Brochure MR 66/88-85, Brochure.

CHAMP Reach Lift CRL-80, 2/1/85, Brochure.

CHAMP CRL-60 Reach Lift, 2/85, Brochure.

Manitou Price List, 9-1-85, Brochure.

Markhandler 843T/842T, PAB-124, Brochure.

Markhandler 443T, PAB-124, Brochure.

KD Manitou Rough Terrain Lift Trucks, Models R522-2TC and R522-4TC Reach Chief, Brochure.

KD Manitou Rough Terrain Lift Trucks 2-wheel and 4-Wheel Drive, 6/85, Brochure.

Rough Terrain Forklifts, LIFT-IT, Inc., Feb. 1984.

Equipment Limited, Model ZB20024-44, "The Reach Machine", Zoom Boom, Brochure.

Mark Industries, JOB HANDLER LR523, 2-1-85, Brochure.

GRADALL LOED MULTI-PURPOSE MATERIALS HANDLER 554, Brochure.

GRADALL LOED MATERIALS HANDLER 534 B-8, Form No. 8223, 1982, Brochure.

GRADALL MULTI-PURPOSE MATERIAL HANDLER 534B, 1985, Brochure.

LIFTALL R80B, Innovative Leader in Rough Terrain Lift Trucks Lion Manufacturing Co., Inc., Brochure.

HYSTER HIGH LIFT ROUGH TERRAIN TRUCK Z90B, Brochure.

PETTIBONE Extendo Model 88, EEAC-140, Brochure.

OMNI Equipment Corporation, Brochure.

LIGHT FORK
HEAVY FORK
X
2 X
A
B
61
70
72
74
75
76
77
78
79
79a
81
83
90
91
92
93
94
95
100
101
105
110
111

FORK LIFT VEHICLE HAVING A TELESCOPIC BOOM WITH AN ARTICULATED JIB SECTION CAPABLE OF VERTICAL AND HORIZONTAL SWINGING RELATIVE TO THE BOOM

This is a division of application Ser. No. 07/394,889, filed 8-17-89, now U.S. Pat. No. 4,986,721.

This invention relates to an extendable boom fork lift vehicle.

BACKGROUND OF THE INVENTION

The fork lift vehicle is well known. It is a vehicle that can be driven from place to place and carries at its front end two parallel forks. The forks are primarily adapted to slide under a pallet containing heavy materials to be shifted from place to place. The fork lift slides under the pallet, lifts that pallet and materials, transports those materials to the desired place, lowers the materials and slides out from under the pallet.

The fork lift thus described has no capability of extending to a position spaced from the vehicle. Illustrative of the need for extending the capability are military applications. In times of combat, for example, containers carrying ammunition and other supplies are deposited out in the field where the military action is taking place. The terrain may be rough and hilly. There is a need to reach about twenty to twenty-four feet into the containers to quickly pick up the supplies and deposit them out of the container for further handling and use. Some supplies are palletized and are lifted by parallel forks that slide underneath the pallets in a well known manner. Other supplies have bars or the like over the top of the supplies and must be picked up from the top. Rocket launcher pods (Multiple Launch Rocket System) are in this category.

To satisfy these needs, a Variable Reach Rough Terrain Fork Lift Vehicle has been constructed and used. The vehicle has a frame that is mounted on two axles that carry four wheels. An extendable boom is pivoted at its rear end over the rear portion of the vehicle. Two hydraulic actuators are connected at one end to the boom and at the other end to the frame between the two axles.

The boom has two extensions and two hydraulic actuators to operate the two extensions. At the end of the innermost boom is a carriage that has parallel forks. Light-duty forks capable of reaching far into the container are normally mounted on the end of the boom, but these can be replaced with a heavy-duty carriage for lifting very heavy weights such as a ten thousand pound communication module where no substantial reaching into the container is required.

An overhead jib attachment for the MLRS is provided. It is carried in sections. These sections are connected together and mounted on the fork carriage. The fork carriage is shiftable and tiltable for its normal operations and by mounting the jib on it, the jib becomes shiftable and tiltable in order to reach into a container, be it positioned on the ground or on a flat bed trailer or the like, to reach the MLRS.

SUMMARY OF THE INVENTION

It has been an objective of the present invention to reduce the weight of the known VRRTFL and to increase the weight of the load that it can lift.

Another objective of the invention has been to reduce the complexity of the VRRTFL by reducing the number of hydraulic actuators required for its operation.

Still another objective of the present invention has been to provide for a faster conversion among the three lifting instruments on the end of the boom, namely the light-duty fork carriage, the heavy-duty fork carriage, and the overhead jib.

These objectives of the present invention are attained first in the repositioning of the boom and the actuator. A single boom actuator (piston and cylinder), replacing two actuators, is mounted directly over the rear axle where the main frame for the vehicle is normally massive to provide the strength necessary to apply the weight supported by the frame to the axle. The rear end of the boom is provided with a depending bracket that permits the boom pivot to be in line with the vehicle axles. This permits the actuator to be approximately horizontally-oriented and to make a substantially horizontal thrust on the boom to swing it vertically through the required angles up to about 45° above horizontal and 13° below horizontal.

By placing the thrust on the large section portion of the frame over the rear axle, the frame between the two axles can be significantly reduced in weight since the loading upon it is greatly reduced. Further, by thrusting generally horizontally against the boom, the frame rearward of the rear axle that supports the boom is stressed in tension rather than bending and, hence, can be much lighter. The consequences of these changes permit the frame to be almost half the weight and greatly reduced complexity compared to that of the known vehicle.

The objects of the invention are further attained by a redesign of the boom and jib. The boom has a single extension (inner boom) and that extension carries the jib which can be fixed or pinned in an inner position as well as an extended position. A single elongated hydraulic actuator is fixed at one end to the outer boom and is fixed at the other end by means of a universal knuckle to the jib. The inner boom carries the light-duty fork carriage with tilt capability about a horizontal axis and lateral shifting capability.

When the jib is unpinned with respect to the inner boom, the thrust of the actuator first thrusts on the universal knuckle at the inner end of the jib which is connected to the actuator. Thus, the jib is extended to an operative position with the knuckle at the end of the inner boom. That knuckle is then pinned to the outer end of the inner boom.

The jib is connected to the light-duty forks so that the mechanism that operates the light-duty forks for vertical tilting and side-to-side movement can swing the boom up and down and left and right. Thus, the vehicle operator can drive the vehicle roughly into position adjacent to the open end of a container. There, the fine positioning of the end of the jib is accomplished by means of the fork carriage actuators. Several advantages are derived from the boom structure. First, the jib is in place, that is, it is carried integrally with the inner boom and it is in one piece. Second, a single hydraulic actuator is required for the boom operation, thereby reducing the hydraulic complexity and reducing the overall weight of the vehicle.

The requirement of demounting of the light-duty carriage and replacing it with the heavy-duty carriage, with the heavy-duty carriage carrying its own hydraulic system that must be attached to the inner boom, is eliminated. In accordance with the present invention, the heavy-duty carriage is mounted on the light-duty carriage and utilizes the hydraulics of the light-duty carriage for operation of the heavy-duty carriage.

More specifically, the light carriage has a yoke and the heavy carriage has lift pins engageable with the yoke. To make the attachment, the operator folds up to a vertical attitude the light forks. This can be done simply by swinging them downwardly against the heavy carriage. The yoke of the light carriage is moved under the pins of the heavy carriage and raised upwardly to pick up the weight of the heavy carriage. The heavy carriage swings around the pins against the light carriage where latch pins connect the two together.

In bringing the light carriage into position against the heavy carriage, the vertically-folded forks are captured in channels mounted on movement multiplier cylinders on the heavy carriage. These multipliers permit the movement of the light-duty forks laterally to be translated to the heavy-duty forks.

Another feature of the invention is a movement multiplier interconnection between the light-duty forks and the heavy-duty forks which enables the short travel of the light-duty forks to be translated into a longer travel of the heavy-duty forks. In the preferred form of the invention, the travel relationship is two-to-one.

BRIEF DESCRIPTION OF THE DRAWINGS

The several objectives and features of the present invention will become more readily apparent from the following detailed description taken in conjunction with the accompanying drawings in which.

DETAILED DESCRIPTION OF THE INVENTION

The Booms and Mounting Therefor

Figure 2:
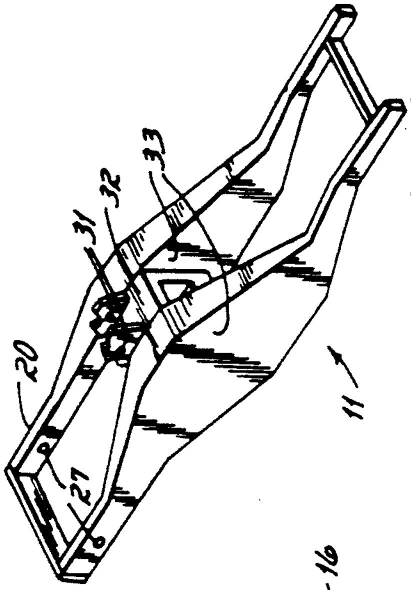
FIG. 2 .is a perspective view of the main frame for the vehicle of FIG. 1.
Figure 1:
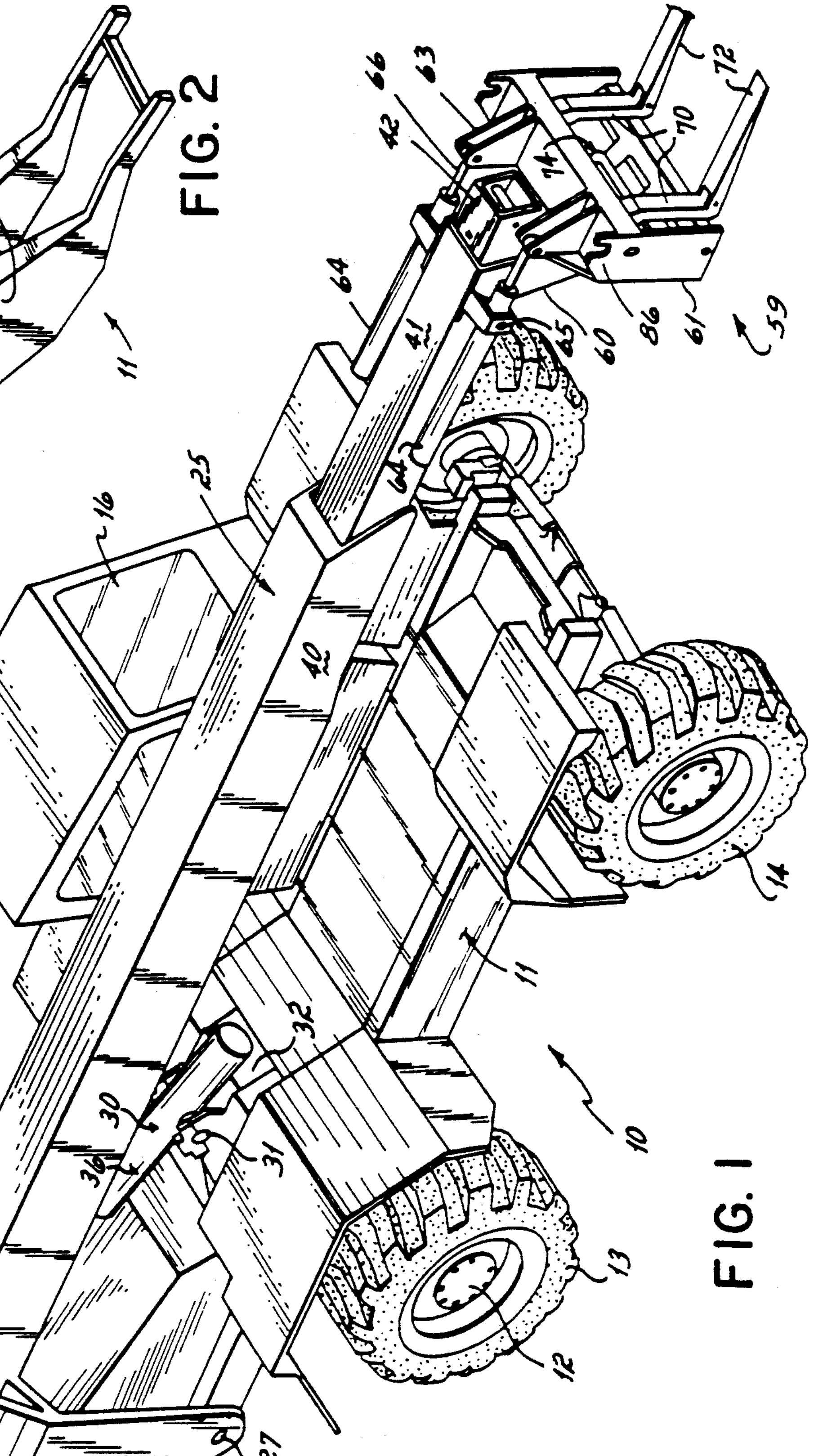
FIG. 1 is a perspective view of an extendable boom rough terrain fork lift vehicle in accordance with the present invention.

Referring to FIGS. 1 and 2 the vehicle is shown at 10. It has a frame 11 which carries a rear axle 12 and rear wheels 13. Front wheels 14 are mounted on the frame with a conventional steering mechanism operated from a cab 16.

The frame has a rear extension 20. A boom assembly 25 has a depending bracket 26 mounted on its rear end. The bracket 26 is connected by a pin 27 to the frame extension 20.

Figures 3, 4, 5:
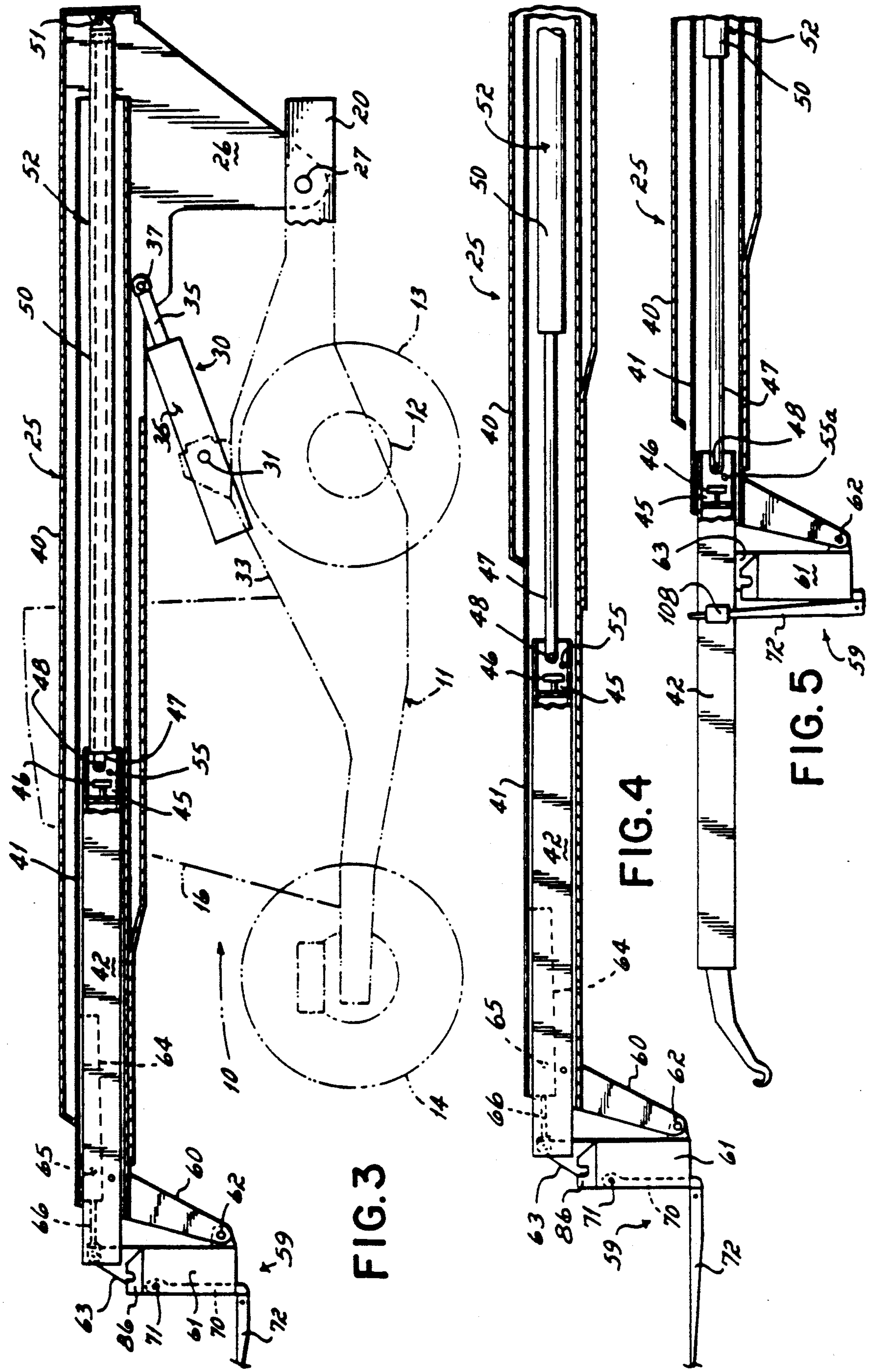
FIG. 3 is a longitudinal cross section through the boom of the vehicle of FIG. 1 shown in a retracted position.
FIG. 4 is a view similar to FIG. 3 showing the inner boom extended with respect to the outer boom.
FIG. 5 is a view similar to Fig. 3 showing the jib extended.

As best seen in FIGS. 2 and 3, an actuator cylinder 30 is pivoted at 31 to a casting 32 which is fixed between two large section frame members 33 of frame 11.

It can be seen that the boom pivot axis 27 is just slightly above the level of the rear axle 12. Further, the load applied to the frame by the cylinder 30 is on the casting 32 which is mounted on the large section part of the frame 33, thus applying the load at the strongest part of the frame.

A rod 35 projects out of the cylinder 36. The actuator 30 is pivoted to the boom on an axis 37. It can be seen (FIGS. 13 and 14) that when the rod 35 is extended, the force applied to the boom is in a generally horizontal direction, as contrasted to the vertical direction of the prior vehicle, thereby stressing the rear frame section 20 primarily in tension which, in turn, enables the rear frame extension to be made considerably lighter than it would if it were stressed in a bending moment.

The boom assembly 25 has an outer boom 40 and an inner boom 41 that is slidably mounted in the outer boom. A jib 42 is slidably mounted in the inner boom. As shown in FIGS. 3, 4 and 5, the jib 42 has a knuckle joint 45 which is connected to the inner end of the jib 42 on a vertical axis 46. The knuckle joint is connected to the outer end of a rod 47 on a horizontal axis 48 of the knuckle joint, thereby making the knuckle joint a universal connection between the jib 42 and the actuator rod 47. The actuator rod is slidable in a cylinder 50 of actuator 52 which is connected at 51 to the outer boom 40.

The jib 42 is normally pinned at 55 to the inner boom 41. Therefore, as seen in FIG. 4, when thrust is applied to the jib 42 by the extension of the actuator rod 47, the jib is fixed to the inner boom 41 and carries the inner boom to its extended position.

When the jib 42 is to be deployed from within the inner boom 41, the pin 55 is released and the extension of the actuator rod 47 causes the jib 42 to extend with respect to the inner boom (see FIG. 5). When full extension is achieved, the knuckle joint 45 is aligned with the pin position 55. In this position, a similar pin 55*a* is applied to lock the knuckle joint at the extended end of the inner boom so as to fix the inner or knuckle end of the jib with respect to the inner boom. Instead of the manually replaceable pins 55, 55*a*, it is conceived that the knuckle joint could be locked into either of its positions by an automatic brake or the like.

The Fork Carriages

Figure 7:
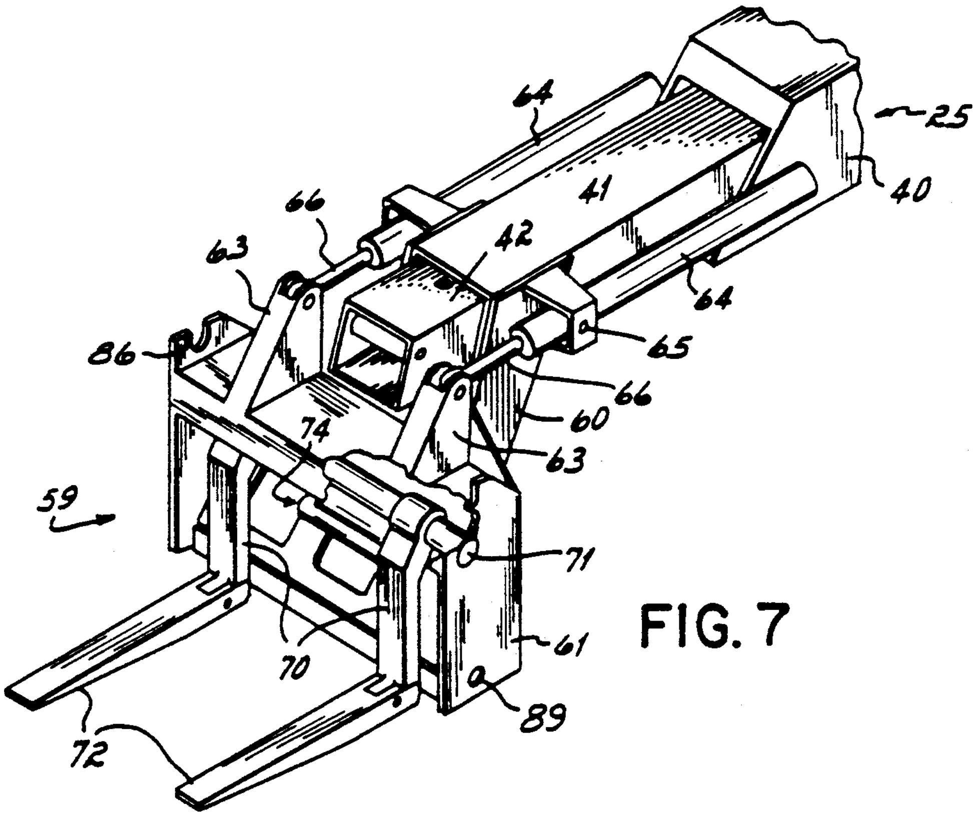
FIG. 7 is a perspective view of the light-duty fork lift on the end of the inner boom.
Figure 11:
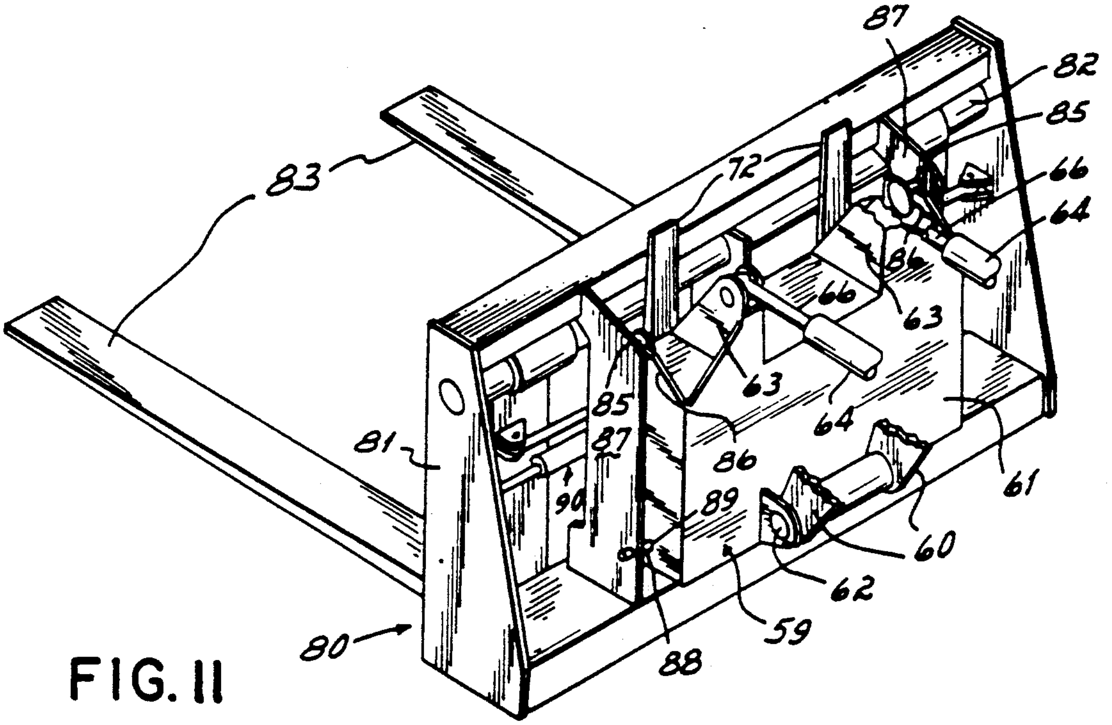
FIG. 11 is a perspective view similar to that of Fig. 10 but taken from the rear of the fork lifts.

A light-duty carriage 59 is illustrated in FIGS. 1, 7, and 11. The inner boom has depending brackets 60 on each side. The carriage has a generally rectangular housing 61 that is pivotally mounted on a shaft 62, at its lower end, to the lower ends of the brackets 60. The carriage housing can thus pivot about the shaft 62. The housing 61 has a pair of upwardly-projecting brackets 63. These brackets are connected to double-acting tilt cylinders 64 that are pivotally mounted at 65 to each side of the inner boom 41. The tilt cylinders have rods 66 which are pinned at their ends to the brackets 63. It can easily be seen that by actuation of the double-acting tilt cylinders, the housing 61 can be tilted. The carriage 59 has a pair of vertical arms 70 that are slidable on a rod 71 extending across the upper end of the housing 61. Hinged forks 72 are pivotally mounted on the lower ends of arms 70. The forks are normally in the horizontal position as shown, but can be folded up to a vertical position (for reasons to be described). Each arm 70 is connected to a double side shift cylinder 74, shown in Figs. 7, 12A and 12B, which comprises two cylinders 75, 76 welded to each other. The upper cylinder 75 has a piston rod 77 that is pivoted to the housing 61. The lower cylinder 76 has a rod 78 that is pivoted to the arm 70 of one of the forks. The cylinders 75, 76 are connected to each other by oil flow lines 79. When oil is introduced through the lines at 79, the piston rods project out of the cylinders and move the fork laterally. When the flow is reversed, the fork moves in the opposite direction.

Each fork has its own twin cylinder drive. Suitable valves, not shown, are provided for moving the forks toward and away from one another or jointly left or right.

Figure 8:
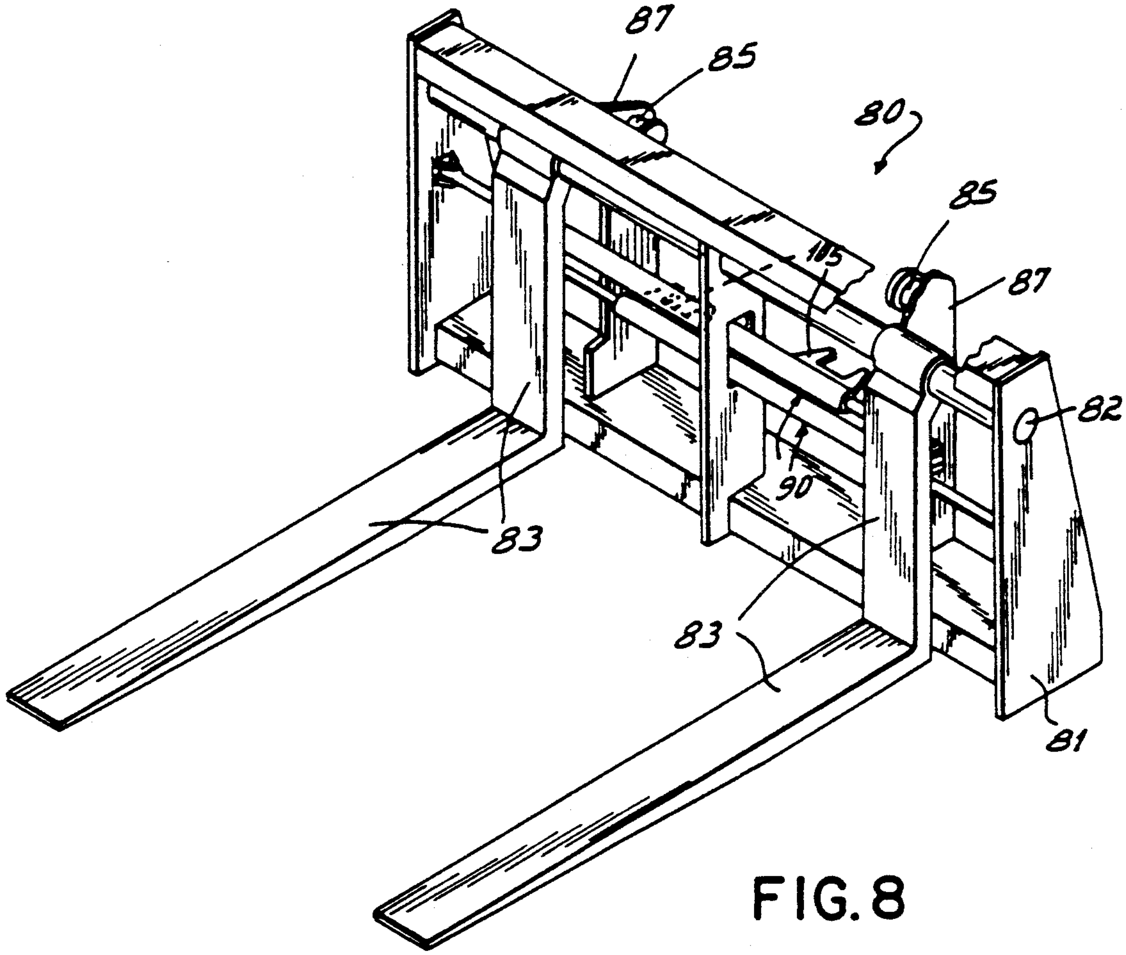
FIG. 8 is a perspective view of a heavy-duty fork lift attachment.
Figure 9A:
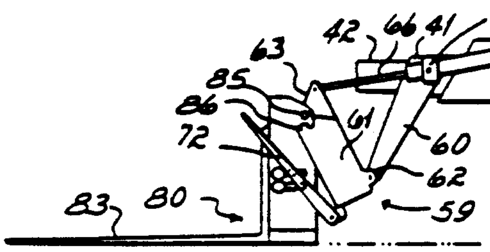
FIG. 9A is a diagrammatic side elevational view illustrating a first step in the attachment of the heavy-duty fork lift.
Figure 9B:
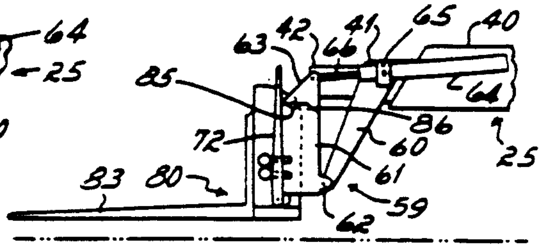
FIG. 9B is a view similar to FIG. 9A showing the attachment of the heavy-duty fork lift completed.
Figure 10:
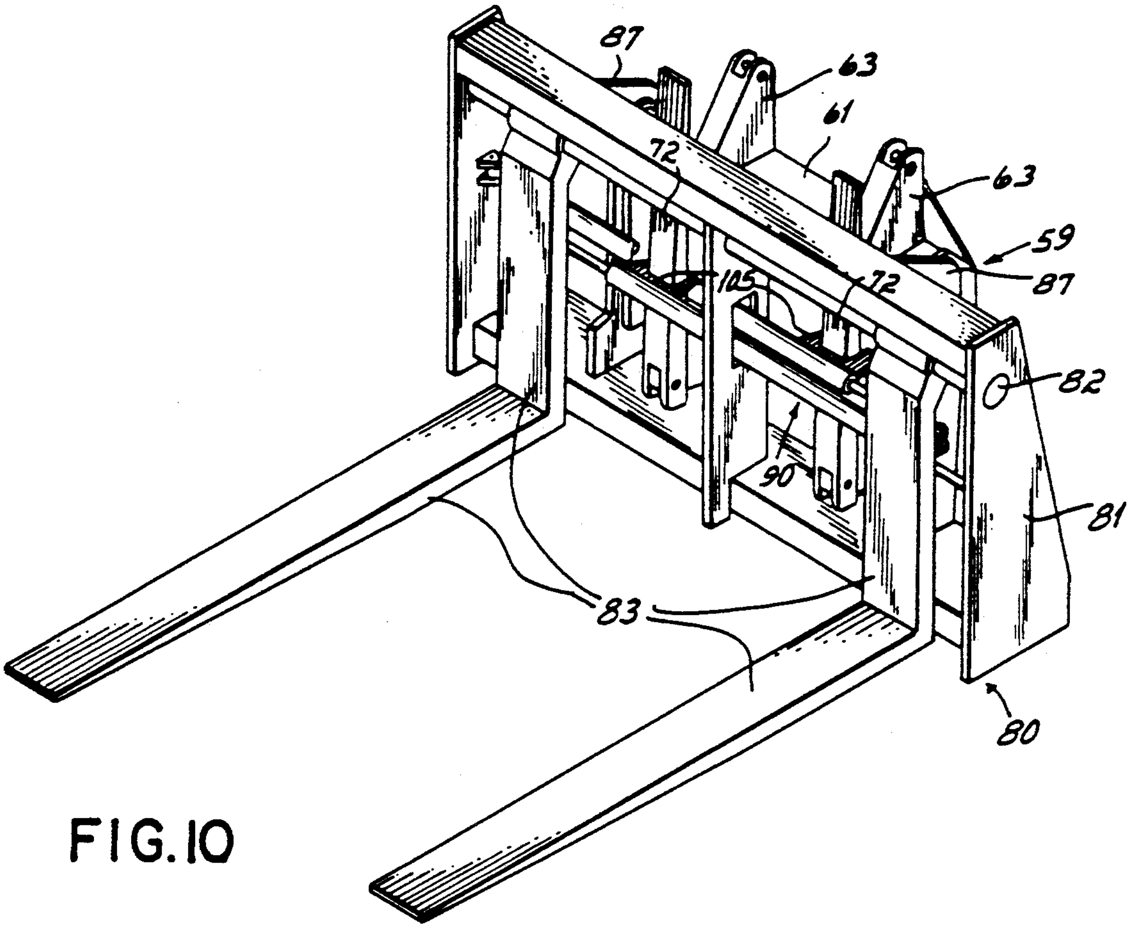
FIG. 10 is a perspective view of the combined heavy and light-duty fork lifts.

The heavy-duty carriage is shown at 80 in FIGS. 8, 10 and 11. It has a housing 81 that has a horizontal rod 82 across its upper end. A pair of forks 83 are mounted on the rod 82 for lateral sliding movement. As best shown in FIGS. 8 and 11, at the back side of the housing 80, the heavy carriage has a pair of lift pins 85. The light carriage has matching recesses in yokes 86 that are adapted to slide under and engage the lift pins 85 in order to lift the heavy carriage. (See also FIGS. 9A and 9B.)

The heavy carriage has vertical braces 87 with latch pins 88 which are engageable with the holes 89 in the light-duty housing 61 to secure the heavy-duty carriage to the light-duty carriage.

Figures 12A, 12B:
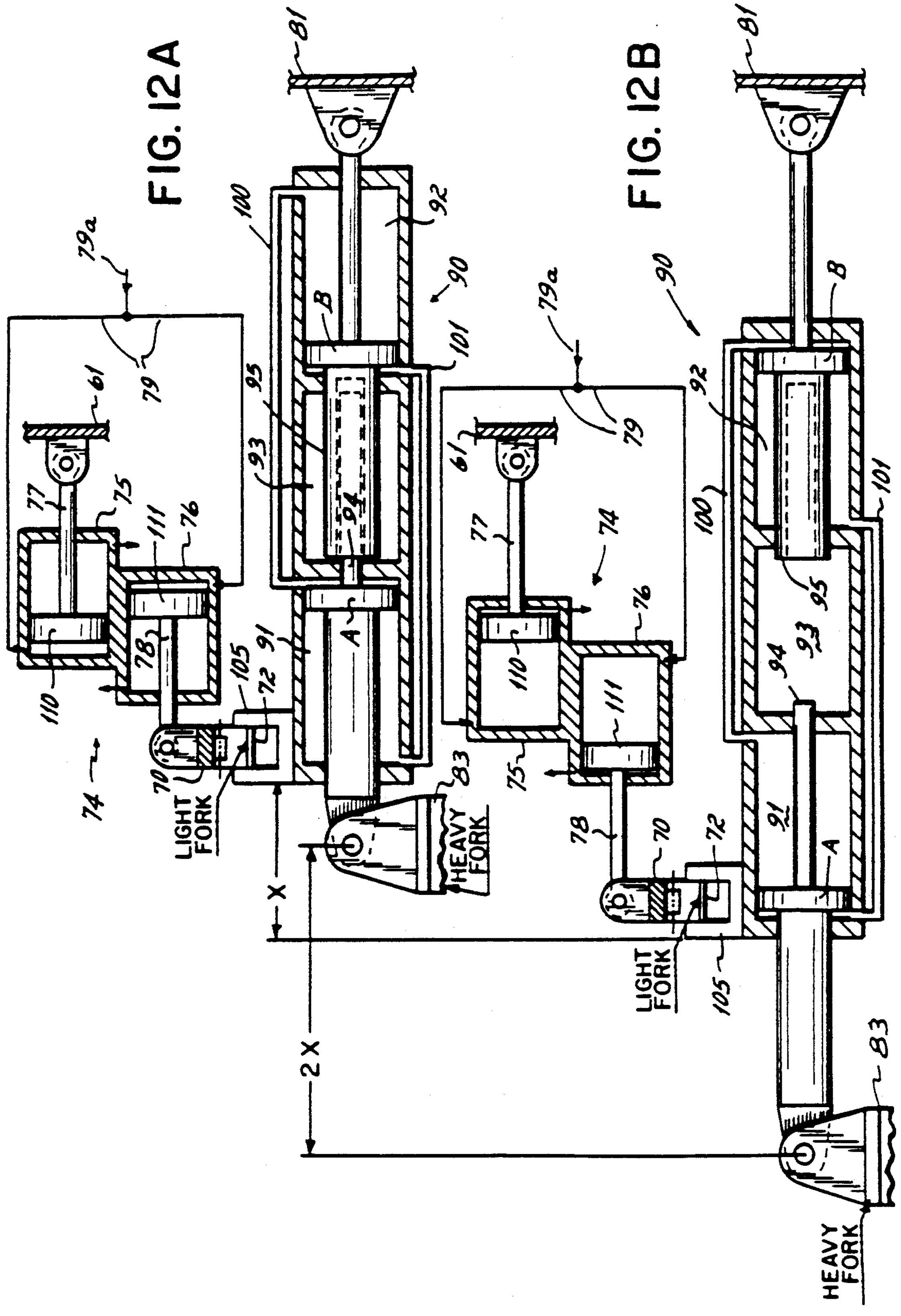
FIG. 12A is a diagrammatic cross-sectional view of one side of the hydraulic system for operating the combined fork lifts.
FIG. 12B is a view similar to that of FIG. 12A showing the forks moved to a lateral position.

The heavy-duty carriage carries a side shift multiplier linkage 90 for each fork 83. As shown in FIGS. 12A and 12B, the multiplier linkage includes a cylinder having a left chamber 91, containing a piston A and rod 94 and a right chamber 92 containing a piston B. A center chamber 93 carries the telescoping rod 95 for the piston B. Piston A is connected to one of the forks 83 and piston B is connected to the housing 81. An oil line 100 connects the inner end of chamber 91 and the outer end of chamber 92 and an oil line 101 connects the outer end of chamber 91 with the inner end of chamber 92. The cross-sectional area of piston rod 94 is the same as piston rod 95 so that the volume of chamber 91 when the linkage is retracted as in FIG. 12A is the same as the volume of 92 when the linkage is extended as in FIG. 12B.

It can be seen by comparing FIGS. 12A and 12B that when the light fork 105 is moved toward the left by a distance X, the heavy fork 83 will be moved by a distance of 2X. Piston "A" actually moves distance 2X relative to "ground": 1) a distance X by virtue of cylinder 90 moving X, plus: 2) a distance X by virtue of piston A moving relative to cylinder 90.

Each cylinder 90 on the heavy-duty carriage carries a channel 105. When the light-duty carriage is brought into position to pick up the heavy-duty carriage, the channels on the respective cylinders will engage and capture the folded up forks 72. With the forks 72 in the channels 105, the movement of the forks 72 will control or direct the movement of the forks 83 except that the forks 83 will move twice the distance of the forks 72. Thus, the heavy-duty carriage has control of its forks imparted to it by the hydraulic system that controls the light-duty carriage 59 without any disconnecting and reconnecting of hydraulic systems when the type 2 carriage is placed into service. This is contrasted to the prior arrangements where the light carriage was totally removed and its hydraulic system disconnected and replaced with the heavy-duty carriage and its hydraulic system.

Operation

The description of the operation begins with the vehicle in the attitude shown in FIG. 3. The boom 25 is in a horizontal attitude and the inner boom 41 and jib 42 are both retracted. Only the light-duty carriage 59 is mounted on the boom. The actuator 30 is slightly extended to hold the boom in the horizontal attitude.

Figure 13:
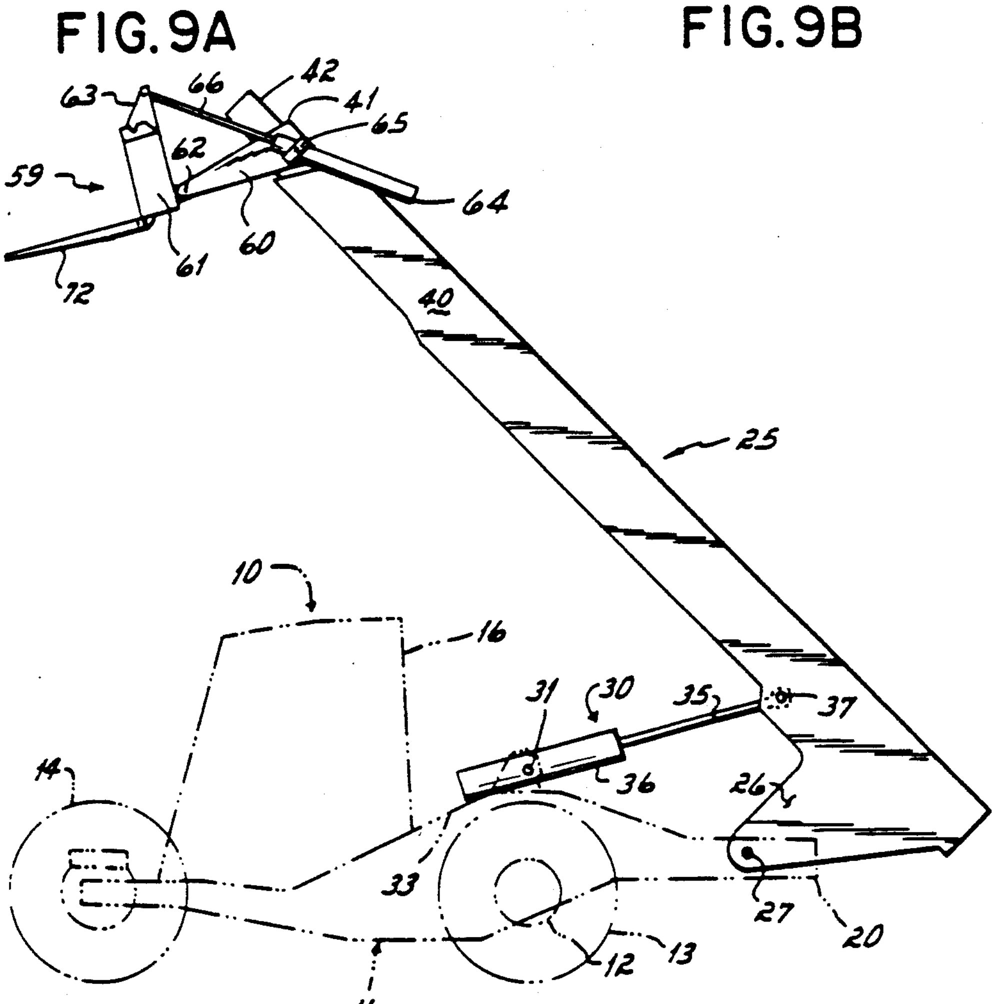
FIG. 13 is a diagrammatic side elevational view showing the boom at maximum lift angle.

If the actuator is extended to the fullest extent, as depicted in FIG. 13, the boom is swung through 45°. It can be seen that the actuator 30 remains predominantly in a horizontal attitude which stresses the rear extension 20 of the frame 11 in tension. Through this geometric relationship of the frame, boom and actuator, it is possible to reduce significantly the weight of the frame. FIG. 13 also illustrates the actuation of the carriage 59 and forks 72 carried by it through the operation of the tilt cylinders 64. FIG. 13 thus illustrates the fact that even though the boom is swung at an extreme upward angle, the fork not only can be maintained at a horizontal attitude, but can be swung 15° below horizontal.

Figure 14:
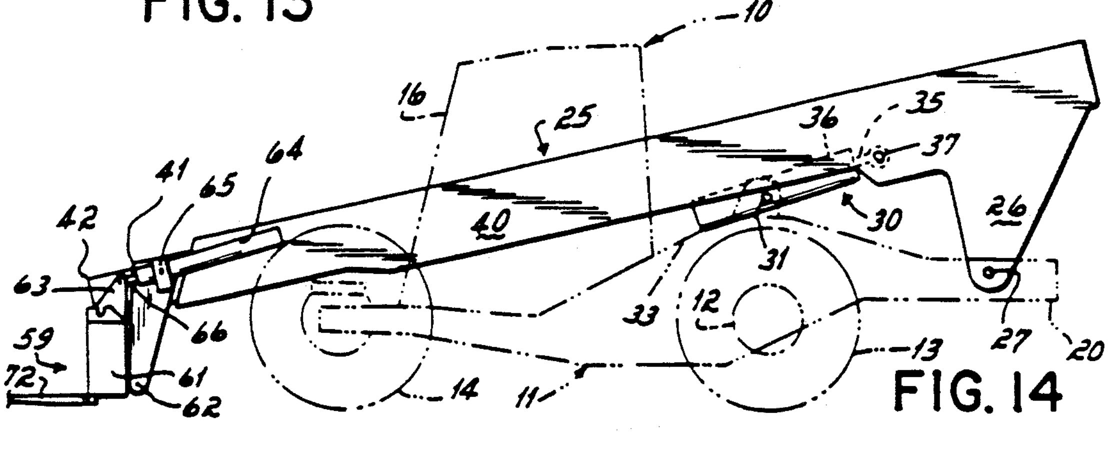
FIG. 14 is a diagrammatic side elevational view showing the boom in a lowered position.

Referring to FIG. 14, by full retraction of the actuator 30 the boom can be swung downward past horizontal to an angle below horizontal of 12.5°. By reference to the carriage 59 and forks 72, it is seen that the forks can be swung to ground level as is required for picking up the heavy-duty carriage, as will be described below.

Referring to FIG. 4, the inner boom 41 can be extended with respect to the outer boom 40 by the extension of the actuator rod 47 with respect to the cylinder 50 of extension actuator 52. For extension of the inner boom 41, the jib 42 to which the rod 47 is connected is pinned at 55 to the inner boom. Thus, when the rod 47 imparts a longitudinal force to the jib 42, the jib carries with it the inner boom 41.

FIG. 5 illustrates the extension of the jib 42. To extend the jib 42, the connection of jib to inner boom at 55 is released. The extension of the rod 47 acting on the jib extends the jib 42 with respect to the inner boom 41. This preferential extension occurs because the friction between jib 42 and the inner boom is significantly less than the friction between the inner boom 41 and the outer boom 40. When the jib is extended, the knuckle joint 45 at the inner end of the jib 42 is pinned as at 55*a* to the inner boom 41 at the hole, providing for the pinning at 55. The knuckle joint 45 remains within the outer end of the inner boom 41. This outer end of inner boom 41 is constructed so as to permit the jib 42 to swing in a universal direction left, right and up and down, the knuckle joint permitting the universal movement of the jib. To effect the movement of the jib, the forks 72 are attached by straps or the like 108 (FIGS. 5 and 6) to the jib. As the fork carriage is moved up and down or side-to-side (as will be described below) so the jib 42 will be moved universally about the knuckle 45.

Figure 6:
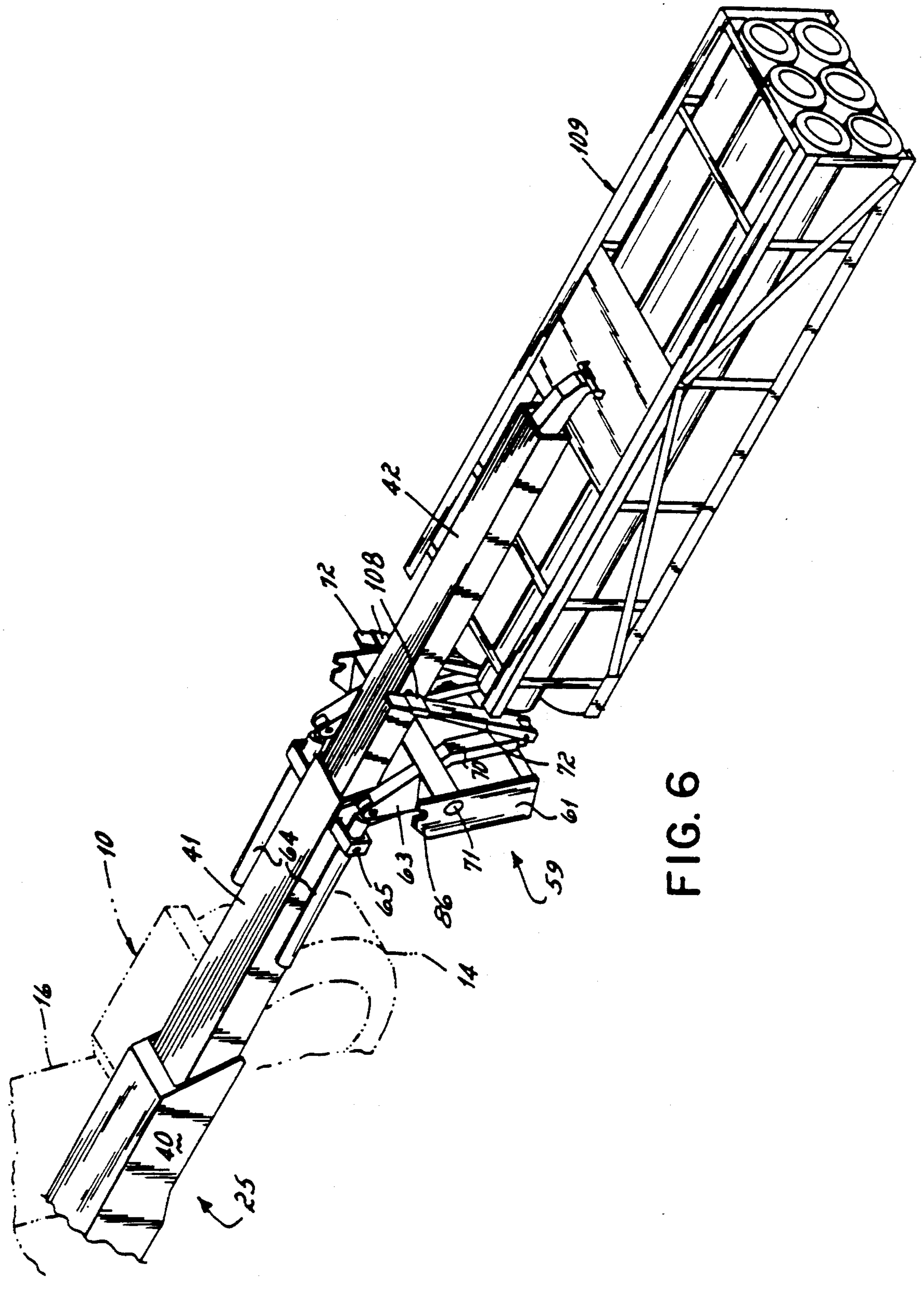
FIG. 6 is a perspective view of the boom with the jib extended and in engagement with a Multiple Launch Rocket System.

When extended, the jib is capable of reaching over the top of a container such as the rocket pod 109 depicted in FIG. 6 to lift it out of a vehicle. Thus, the jib is very useful in picking out elongated articles from the top side which would be unbalanced if lifting from the underside by conventional forks were to be attempted.

The light-duty carriage 59 is tiltable about a horizontal axis 62 (FIG. 13) by means of tilt cylinders 64. Each fork can be moved left or right independently of the other fork by means of double cylinders 75 and 76 (FIGS. 7 and 12A and 12B). Hydraulic fluid from a source 79*a* through lines 79 causes pistons 110, 111 to move in the respective cylinders to thrust a fork 72 away from the housing 61. Fluid in the opposition direction will cause the fork to reverse its position. Thus, the forks on the carriage are able to accommodate themselves, as in fine tuning, to the pallets and the position of them, in the container. For example, if a pallet is against a wall of a container, the forks can be moved totally to one side of the carriage in order to properly engage the pallet to lift it out of the container.

It is contemplated that the light-duty carriage 59 will be deployed with the inner boom extended far into the interior of a container (18–20 feet). Where heavy-duty lifting is required, a heavy-duty carriage 80 must be mounted on the boom 25. The heavy-duty carriage 80 is depicted in FIG. 8. By reference to FIGS. 9A and 9B, 10 and 11, the manner in which the heavy-duty carriage is mounted at the end of the boom is depicted. The boom and vehicle carry the light-duty carriage 59 over the heavy-duty carriage 80 and swing the light-duty carriage downward to pivot the forks 72 upwardly with respect to the carriage. The forks 72 should be aligned with channels 105 on the heavy-duty carriage, the channels being mounted on a respective multiple cylinder 90 (see also FIGS. 12A and 12B). The light-duty carriage 59 is then swung under lift pins 85 with the lift pins being captured in recesses in yokes 86 on the light-duty carriage. In this condition, lifting of the light-duty carriage causes the heavy-duty carriage to spring into its final position with respect to the light-duty carriage where it is pinned by latch pin 88, as shown in FIG. 11.

The heavy-duty forks 83 are also selectively and independently movable, as are the light-duty forks 72. They are moved by the same mechanism that moves the light-duty forks, that movement being imparted to the hydraulic forks through the channels 105. As shown in FIGS. 12A and 12B, motion of a light-duty fork 72 is transmitted to a hydraulic fork 83 by movement of the cylinder 90. Tilting of the heavy-duty carriage 80 and its respective forks 83 is also effected by tilting of the light-duty carriage 59 and their respective forks 72 through the tilt cylinder 64.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. An extendable boom comprising:

a hollow outer boom, a hollow inner boom telescopically mounted within said outer boom, a jib telescopically mounted within said hollow inner boom, an extendable hydraulic actuator disposed within said hollow inner and outer boom and having an inner end connected to said outer boom, said actuator having an outer end permanently connected to the inner end of said jib, means for selectively fixing said jib to said inner boom in a retracted jib position and in an extended jib position, whereby when said jib is fixed to said inner boom in said retracted jib position, extending said hydraulic actuator extends said inner boom, and whereby when said jib is released from fixation to said inner boom, extending said hydraulic actuator extends said jib and thereafter said inner boom, a fork lift carriage mounted on said inner boom, a pair of forks mounted on said carriage, means for vertically tilting said carriage about a horizontal axis, means for moving said forks from side-to-side, universal pivot means having two orthagonal axes of rotation connecting said jib to said actuator to permit swinging of said jib in any direction with respect to said inner boom when said jib is in said extended jib position, means connecting said forks to said jib to move said jib up and down and left and right upon tilting of said carriage and shifting of said forks from side-to-side, respectively, when said jib is in said extended jib position.

* * * * *